United States Patent
Trefz et al.

[11] Patent Number: 5,971,134
[45] Date of Patent: Oct. 26, 1999

[54] METHOD AND APPARATUS FOR CONVEYING ARTICLES

[75] Inventors: Wolfgang Trefz, Reutlingen; Hansjörg Klein, Aichwald; Hans-Martin Bohnaker, Owen/Teck, all of Germany

[73] Assignee: bielomatik Leuze GmbH & Co., Germany

[21] Appl. No.: 08/879,209

[22] Filed: Jun. 19, 1997

[30] Foreign Application Priority Data

Jun. 26, 1996 [DE] Germany ............................ 196254701

[51] Int. Cl.$^6$ .................................................. B65G 47/26
[52] U.S. Cl. .................................... 198/460.1; 198/460.3; 198/461.1; 198/689.1
[58] Field of Search ........................... 198/419.2, 460.1, 198/460.3, 461.1, 689.1

[56] References Cited

U.S. PATENT DOCUMENTS

| | | | |
|---|---|---|---|
| 3,827,548 | 8/1974 | Matsuo | 198/184 |
| 4,230,218 | 10/1980 | Kunzmann | 198/461 |
| 4,456,117 | 6/1984 | Szczepanski | 198/461 |
| 4,518,075 | 5/1985 | Aykut et al. | 198/460.1 |
| 4,651,984 | 3/1987 | Emrich | 198/689.1 |
| 4,720,006 | 1/1988 | Lenherr | 198/415 |
| 4,727,803 | 3/1988 | Nobuta et al. | 198/493 |
| 5,004,094 | 4/1991 | Brandt | 198/460 |
| 5,341,915 | 8/1994 | Cordia et al. | 198/460 |

FOREIGN PATENT DOCUMENTS

| | | | |
|---|---|---|---|
| 0 608 861 A2 | 7/1995 | European Pat. Off. | B65G 47/31 |
| 965914 | of 1950 | France . | |
| 1 085 467 | of 1960 | Germany | B65G 15/58 |
| 1 907 163 | 8/1970 | Germany | B65G 15/58 |
| 20 36 337 B2 | 2/1971 | Germany | B65G 51/02 |
| 1781436 | 4/1973 | Germany | B65G 15/58 |
| 23 26 524 B2 | 3/1974 | Germany | B31B 1/02 |
| 25 14 792 A1 | 10/1975 | Germany | B65G 47/31 |
| 27 24 980 B1 | of 1978 | Germany | B65H 5/02 |
| 31 31 469 A1 | 5/1982 | Germany | A21C 9/08 |
| 36 12 021 C2 | 10/1987 | Germany | B65H 5/02 |
| 44 33 912 C2 | 3/1996 | Germany | B65G 57/22 |
| 2 212 469 | 11/1988 | United Kingdom | B65G 47/31 |
| 2 282 364 | 9/1993 | United Kingdom | B65H 5/22 |

OTHER PUBLICATIONS

DE–AN: E 4461 v. May 13, 1953.

*Primary Examiner*—Joseph E. Valenza
*Attorney, Agent, or Firm*—Quarles & Brady

[57] ABSTRACT

The present invention relates to a method and apparatus for conveying articles, particularly sheet stacks, the articles (5, 105) being conveyed in a common direction on a connecting conveyor (2) and an accumulating conveyor (3) overlapping with the latter and following articles (5) are connected to previously conveyed articles (105) in accordance with different speeds of the two conveyors. The method or apparatus is characterized in that, at least in the overlap area, the articles are sucked by a suction air device (42) onto the connecting conveyor and/or accumulating conveyor. Preferably the articles are also subject to air blast action in the overlap area of the two conveyors.

23 Claims, 5 Drawing Sheets

METHOD AND APPARATUS FOR CONVEYING ARTICLES

FIELD OF THE INVENTION

The present invention relates to a method for conveying articles, particulary sheet stacks, in which the articles are conveyed on a connecting conveyor and an accumulating conveyor overlapping therewith in a common direction and following articles are connected to previously conveyed articles in accordance with the different speeds of the two conveyors.

The present invention relates to a conveying apparatus, particularly for performing the method, having a connecting conveyor and an accumulating conveyor, which have a common conveying direction, overlap one another and are operable at different speeds.

BACKGROUND ART

Such conveying apparatuses and methods are used in order e.g. with small size paper cross-cutters, in which juxtaposed sheet stacks are formed from a wide paper web in the form of numerous blanks, e.g. stacks of copy, writing or typing paper, which convey from the processing means sheet stacks accumulated in non-uniform intervals and compensate the latter up to a further processing of the sheet stacks, e.g. packing thereof.

As the further processing of the sheet stacks normally makes it necessary for them to arrive continuously and with a substantially constant spacing, between the cross conveyor and the further processing is provided an accumulation section, whereof the individual sheet layer groups run up onto one another in such a way as to temporarily form an uninterrupted row, after which they are drawn apart to the constant spacing on a separating conveyor, which can link with the accumulation section.

In order to connect with one another the initially differently spaced sheet stacks, various arrangements of connecting and accumulating conveyors are known. It has e.g. been proposed to place upstream of a continuously running belt conveyor a belt section overlapping the same with upper and lower belts in the manner of belt grippers. Sheet stacks to be connected are held between the upper and lower belts and moved at an increased speed, so that the sheet stack is uninterruptedly connected to the last sheet stack of the preceding group.

DE-36 12 021 discloses an accumulating conveyor system, in which the connecting conveyor overlaps the accumulating conveyor and the individual accumulating belts are subdivided into several sections, which can be individually raised as a function of the moving past of the sheet layers, so that they raise the sheet layers from the discontinuously running connecting conveyor and decelerate same to the lower accumulation speed. However, this requires a multiple subdivision and a complicated control, as well as a corresponding lifting mechanism for the accumulating belts.

SUMMARY OF THE INVENTION

The object of the invention is to provide a method and an apparatus for conveying articles making it possible in simple manner to convey articles, particularly sheet stacks, from sensitive materials and at a high speed, without damaging the surface of the articles or displacing the latter.

With regards to the method, the invention solves the problem in that the articles are sucked at least in the overlap area by means of suction air onto the connecting conveyor and/or the accumulating conveyor.

The articles indifferently located on the connecting conveyor and the accumulating conveyor in the overlap area, i.e. indifferent with regards to which of the two conveyors an article is to run in the overlap area at different speeds of the two conveyors, it is coupled by means of the suction air action to one of the two conveyors and also removed therefrom, whilst the in each case other conveyor can pass through relative to the article without engagement. Thus, an article located in the overlap area is at all times sucked onto the conveyor, so that its position is determined by the position of the particular conveyor. The articles are so coupled to the connecting conveyor and accumulating conveyor that a following article, which is to be connected to the preconveyed article, is conveyed by the connecting conveyor at a higher speed than that of the accumulating conveyor in the overlap area of the two conveyors, whilst the preconveyed article in the overlap area is coupled to the accumulating conveyor, the more rapidly running connecting conveyor passes through relative to the previously conveyed article without engagement. The coupling of the articles by suction air has the advantage that the entrainment with one of the conveyors takes place simply and gently, without gripper-like pressure on the articles or giving rise to a slipping or displacement risk through a raising of the articles from the running conveyor with a different speed.

Preferably, by modifying the conditions determining the adhesive action on the conveyors or the contacting of the conveyors by the articles, the latter are decoupled from the connecting conveyor at an accumulation point and coupled to the accumulating conveyor.

As a function of the arrangement and construction of the connecting and accumulating conveyors, this can be achieved in different ways.

For example, in an arrangement where the articles move along with the accumulating conveyor without suction air action, the latter only takes place in the vicinity of the connecting conveyor and the articles can be decoupled from said connecting conveyor by disconnecting the suction air supply and coupling to the accumulating conveyor. The disconnection of the suction air supply modifies the friction action of the conveyor in the overlap area, so that articles, which adhere by suction air to the connecting conveyor, then adhere to the accumulating conveyor.

In arrangements where the articles are entrained by the accumulating conveyor without suction air, e.g. the conveying plane of the accumulating conveyor, at least in the unloaded state, can be slightly above that of the connecting conveyor or the friction coefficient of the conveyor surface of the accumulating conveyor can be larger than that of the connecting conveyor.

In arrangements where articles are entrained without suction air action by the connecting conveyor, the suction air action on the articles only takes place in the vicinity of the accumulating conveyor and the articles can be decoupled from the connecting conveyor by connecting the suction air supply and coupled to the accumulating conveyor.

In addition, the conditions determining the friction action can also be modified and the articles decoupled from the connecting conveyor and coupled to the accumulating conveyor due to the fact that the articles are subject to a suction air action in the vicinity of the two conveyors and are successively sucked onto the connecting conveyor and accumulating conveyor, namely until reaching the accumulation point on the connecting conveyor and after reaching the accumulation point on the accumulating conveyor.

This successive double suction has the advantage that at all times an article adheres to one of the connecting or accumulating conveyors and its position is always determined in accordance with that of the particular conveyor. Moreover, the article can be transferred from the connecting conveyor to the accumulating conveyor by switching over the suction from the connecting conveyor to the accumulating conveyor at a precisely predetermined time and without slipping.

According to a further development of the invention the suction of an article to the particular conveyor takes place partly in a limited area of the conveyor and in particular suction air is only supplied to the corresponding conveyor section where the article is located on the conveyor. Thus, the suction air action of the particular article migrates with said article.

Such a partial suction air action reduces the necessary suction air volume. In particular, there is no infiltrated air suction in the area of the conveyor where there is no article.

With a double suction of the articles both on the connecting conveyor and on the accumulating conveyor, a first suction zone migrates in the vicinity of the accumulating conveyor with the preconveyed article and a second suction zone migrates in the vicinity of the connecting conveyor with the following article to be connected, the boundary between the two suction zones being between the articles to be connected and migrates upstream of the following article and downstream of the preceding article.

To be able to better control the friction action in the overlap area, the articles can be supplied with an air blast in the vicinity of the particular conveyor from which the articles are to be decoupled in the overlap area. Between the article to be conveyed and the connecting or accumulating conveyor from which the corresponding article is not to be entrained, an air cushion is produced. In addition, such an air cushion reliably prevents the surface of articles being damaged by the passing through conveyor. This is particularly advantageous in end regions of a conveyor, where surface damage can easily occur.

Preferably the air blast action is limited to in each case one area of the connecting conveyor and/or accumulating conveyor, particularly to the section in which the article is located. This significantly reduces the necessary air blast flow. Thus, the air blast action migrates with the article.

According to an embodiment of the invention, an air blast can be applied to the articles in areas of the connecting conveyor and accumulating conveyor. In the case of a corresponding suction air action in the area of both conveyors, each article can simultaneously be subject to an air blast and a suction air action in the overlap area. Thus, with each article migrates an air blast zone and a suction air zone and in the case of a pair of articles to be linked, the suction air and air blast zones can be interchanged with respect to the connecting conveyor and accumulating conveyor.

According to a preferred embodiment of the invention a preceding article is conveyed by the accumulating conveyor with a constant, first speed and a following article to be connected in a first step is conveyed by the connecting conveyor at a higher, second speed and in a second step is continuously delayed by the connecting conveyor to the slower, first speed of the accumulating conveyor. The speed of the following article is so coordinated relative to the particular position thereof, that the following article reaches the speed of the preconveyed article, namely that of the accumulating conveyor precisely at the accumulation point, i.e. the point where a leading edge of the following article connects to a trailing edge of the preconveyed article. Thus, the articles are gently engaged without any impact. Moreover, this continuous delay of the article to be connected by the connecting conveyor has the advantage that at all times the article adheres to at least one conveyor and is precisely guided.

With regards to the apparatus, the set problem is solved with a conveying apparatus according to the invention in that a suction device is provided for the suction of the articles to the connecting conveyor and/or the accumulating conveyor in the overlap area thereof.

With such a suction device the articles can be coupled in the overlap area of the connecting and accumulating conveyors, with a simple construction, to the particular desired conveyor, without requiring a plurality of belts arranged in gripper-like manner or a multiple subdivision of the accumulating conveyor with a corresponding lifting mechanism.

In order to be able to decouple articles from the connecting conveyor and couple articles to the accumulating conveyor in the overlap area, preferably an adjusting device is provided making it possible to adjust the parameters determining the friction action on the high speed conveyor and/or the accumulating conveyor. Appropriately a switching unit is provided, with which these parameters can be switched between two settings, in which an article either adheres to the connecting conveyor or to the accumulating conveyor. The parameters determining the friction action can include quantities influencing the pressure of an article on the particular conveyor, such as e.g. the level of the conveyor planes of the connecting conveyor relative to the accumulating conveyor, or the ratio of the widths of the conveyor surfaces of the connecting conveyor and accumulating conveyor, with which an article is in contact. However, preferably, the switching unit switches the suction device on and off or between the connecting and accumulating conveyors.

The suction device can have a suction area which, corresponding to the arrangement of the connecting and accumulating conveyors, is only associated with one of the two conveyors. However, preferably, the suction device has a suction area for each of the two conveyors.

In order to be able to direct the suction area partly onto a section of the connecting conveyor and/or the accumulating conveyor, particularly in accordance with the position of the article to be sucked and only to apply a suction action in the bearing area of an article, with the connecting and/or accumulating conveyor are associated numerous fluid chambers, which are immediately adjacent to one another along the conveying direction, are preferably separated from one another by a common partition and are connectable by valves to and can be shut off from a suction air source. Preferably, there is a common suction line, to which the individual chambers are connected by connecting lines and valves located therein.

In order to allow the migration of the suction area of the suction device in accordance with the position of the article to be sucked, the chambers can be successively connected to the suction air source by opening the valves and as soon as the corresponding article has been conveyed over and beyond the area of the corresponding chamber, disconnected again by closing the valves. The chambers can be individually or groupwise connected to the suction air source.

In order to allow the suction area to travel with the article, it is also possible to have a movable, chamber-like suction nozzle. However, the previously described construction of a suction area subdivided into several fluid chambers offers advantages with regards to a simple and stable construction and can e.g. be adapted by additional subdivisions at right angles to the conveying direction in an easier manner to different geometries of the article to be sucked.

According to a further development of the invention, the conveying device has a control device for controlling the suction air device in such a way that in one area of an article only one of the connecting and accumulating conveyors and in particular only in the area of the article to be sucked corresponding to its particular position, is subject to suction air action. In a construction of the suction device with a plurality of valve-operated suction chambers, the valves can be correspondingly controlled by the control device.

In order to be able to supply an air blast to the articles to be conveyed, according to a further development of the invention the conveying apparatus has an air blast device, whereby an outlet thereof can have a plurality of fluid chambers, which can be lined up along the conveying direction of the corresponding conveyor for limiting the same to a section of the high speed conveyor and/or the accumulating conveyor, particularly in accordance with the particular position of an article to be supplied with an air blast. These fluid chambers can be connected to a common air blast source and can be connected and disconnected by corresponding valves.

Preferably, the air blast chambers are identical with the suction air chambers, the chambers being connectable by means of corresponding valves to the suction air source or the air blast source.

Air blast action can either be limited to one of the conveyors, or can be directed both onto the connecting conveyor and the accumulating conveyor. Various combinations are possible in conjunction with the suction device arrangement.

A particularly simple arrangement is an air blast device with an outlet area only associated with the accumulating conveyor. In order to convey an article by the connecting conveyor at a higher speed than that of the accumulating conveyor and connect it to a preconveyed article, air blast is supplied to the article coupled to the connecting conveyor in the vicinity of the accumulating conveyor, so that relative to the latter it slides on an air cushion. As soon as the article has reached the accumulation point and the connecting conveyor and accumulating conveyor convey at the same speed, the air blast action can be disconnected, so that the article can also be brought into static friction engagement with the accumulating conveyor.

According to a further development of the invention, the air blast device can have an outlet associated with the connecting conveyor and an outlet associated with the accumulating conveyor. In this air blast device construction not only the article to be connected and overtaking the accumulating conveyor is supplied with an air blast in the vicinity of the accumulating conveyor, but also the preconveyed article coupled to the accumulating conveyor is supplied with an air blast in the vicinity of the connecting conveyor, so that between said article and the faster running connecting conveyor an air cushion is created. Neither of the articles slides directly on a conveyor running at a different speed. This leads to an optimum protection against damage of the article surface and there is a reduction of the risk of the article sliding or being displaced by contact with conveyor surfaces moving at different speeds.

Preferably there is a control device for controlling the air blast device, in such a way that in one area of an article only the connecting or the accumulating conveyor is supplied with an air blast and preferably only in the area of the article corresponding to its particular position. With an air blast device outlet subdivided into a plurality of fluid chambers, only the air blast chambers are activated in whose vicinity the corresponding article is located. In conjunction with the suction air device in the vicinity of an article the fluid chamber or group of fluid chambers associated with a conveyor is supplied with suction air and the fluid chamber or group of fluid chambers associated with the other conveyor is supplied with an air blast. The control of the suction air or air blast action can be provided by a corresponding control of the valves.

In order to allow the suction air or air blast action to travel with the article moving in the conveying direction, the control device can be connected to a determination device for determining the position of the articles and preferably the determination device in each case has rotary pick-ups associated with the drive mechanisms of the connecting conveyor and/or accumulating conveyor for indirectly establishing the position of the articles. These rotary pick-ups can also have a double function. They are firstly used for determining the position of the articles and secondly provide a feedback control of the connecting or accumulating conveyor, particularly the connecting conveyor, whose speed is variably controlled as a function of the position of the article to be connected.

According to an advantageous development of the invention the connecting conveyor and accumulating conveyor are belt conveyors.

The conveying planes of the connecting and accumulating conveyors can be at different levels, e.g. the conveying plane of the accumulating conveyor, at least in the unloaded state, can be slightly above that of the connecting conveyor, so that an article to be conveyed, in the overlap area of the two conveyors, can be entrained by the accumulating conveyor without suction air action, even with a different connecting conveyor speed. However, preferably the conveying planes of the connecting and accumulating conveyors are in a common plane. The conveyor to which an article is not coupled, thereby forms a support over which the article is guided. This has the advantage that the articles to be conveyed are uniformly supported.

Advantageously a conveying surface of the connecting conveyor and a conveying surface of the accumulating conveyor are smooth. The coupling of an article mainly takes place through the suction of the particular article to the corresponding conveyor surface by means of the suction air device. As a result the friction resistance of a conveyor moving at a different speed relative to the article is small. Correspondingly the surface of the articles is protected from damage. In addition, a smooth conveyor surface leads to a high effectiveness of the suction of the articles or the air blast supply thereto.

In order to be able to individually control the conveying speeds of the conveyors, the connecting and accumulating conveyors preferably have in each case their own drive mechanism, the drive mechanism of the connecting conveyor being operable at a higher initial speed than that of the accumulating conveyor. The term initial speed is understood to mean the speed applied to the conveying means of the connecting or accumulating conveyor, e.g. conveyor belts, e.g. converted from an electric motor by means of a gear. The connecting conveyor is operable at a higher speed than the accumulating conveyor as a result thereof. In particular, the accumulating conveyor can be operated at a constant speed and the connecting conveyor with a variable speed, whose maximum value is above the constant speed of the accumulating conveyor.

Preferably, between the connecting conveyor and the accumulating conveyor is provided a coupling or clutch device particularly a freewheel clutch for the drive of the coupling overtravellable by the connecting conveyor to the drive mechanism of the accumulating conveyor. Thus, the connecting conveyor at least always has the speed of the accumulating conveyor, even when the connecting conveyor drive is disconnected. On connecting the drive mechanism of the connecting conveyor the latter can be accelerated to a higher speed than that of the accumulating conveyor. Advantageously through the coupling device a precise synchronous running of the two conveyors can be obtained, so that in the accumulation point the transfer of an article from the connecting conveyor to the accumulating conveyor, namely the decoupling of the article from the connecting conveyor and its coupling to the accumulating conveyor, takes place without any relative speed of the conveyor surfaces of the two conveyors.

The connecting process of an article in the overlap area can be controlled in different ways. The connecting conveyor can initially be operated at the accumulating conveyor speed and the article is conveyed in accordance with the accumulation speed into the overlap area of the two conveyors, the article then being accelerated therein by the connecting conveyor and is connected to the preceding article with a higher speed than the accumulating conveyor. Prior to reaching the accumulation point the article is continuously decelerated through the connecting conveyor from the increased speed to the accumulating conveyor speed and reaches it precisely at the accumulation point.

Preferably the article is accelerated to the increased speed before reaching the overlap area of the connecting and accumulating conveyors and is conveyed therewith into the overlap area and prior to reaching the accumulation point the article is gradually decelerated through the connecting conveyor to the accumulating conveyor speed. This has the advantage that the article to be connected runs with an already increased speed into the overlap area and does not have to be accelerated there from the accumulation speed to the increased connecting conveyor speed. Thus, there is no need in the overlap area to overcome static friction between the article and the accumulating conveyor.

According to a preferred embodiment of the invention upstream of the connecting conveyor is provided a discontinuously operable feed conveyor, which preferably has a common conveying direction with the connecting conveyor and is operable with a variable speed, particularly smaller or the same as the connecting conveyor speed. For example, sheet stacks from a paper processing machine can be drawn onto the stationary feed conveyor, particularly by means of corresponding grippers and then the feed conveyor is accelerated to the increased connecting conveyor speed and transferred at this speed to the connecting conveyor. Before the articles coming from the feed conveyor reach the connecting conveyor, the latter is accelerated to the increased speed, i.e. higher than the accumulating conveyor speed.

According to a further development of the invention, the connecting conveyor has at least one conveyor belt and the accumulating conveyor at least two conveyor belts, at least one conveyor belt of the connecting conveyor being positioned between the conveyor belts of the accumulating conveyor. Therefore the connecting conveyor has fewer conveyor belts than the accumulating conveyor. The outer conveyor belts of the accumulating conveyor act as a table and form a support on which rest the marginal areas of the articles. The weight of the articles, particularly in the case of sheet stacks and accompanied by a deflection of the latter, presses onto the connecting conveyor belt located in the centre and brings about a good adhesion thereto.

Advantageously the connecting conveyor has more conveyor belts than the accumulating conveyor. The connecting conveyor has at least two conveyor belts, at least one conveyor belt of the accumulating conveyor being positioned in the overlap area between the conveyor belts of the connecting conveyor. With suction of the articles in the vicinity of the connecting conveyor, this arrangement has a larger suction area and correspondingly a good friction of the articles to the connecting conveyor, which is particularly advantageous for the deceleration of the articles prior to reaching the accumulation point.

These and further features can be gathered from the claims, description and drawings and the individual features, both singly and in the form of sub-combinations, can be implemented in an embodiment of the invention and in other fields and can represent advantageous, independently protectable constructions for which protection is hereby claimed.

The invention is described in greater detail hereinafter relative to an embodiment and the attached drawings.

DETAILED DESCRIPTION OF THE PREFERRED EMBODIMENT

Figure 1:
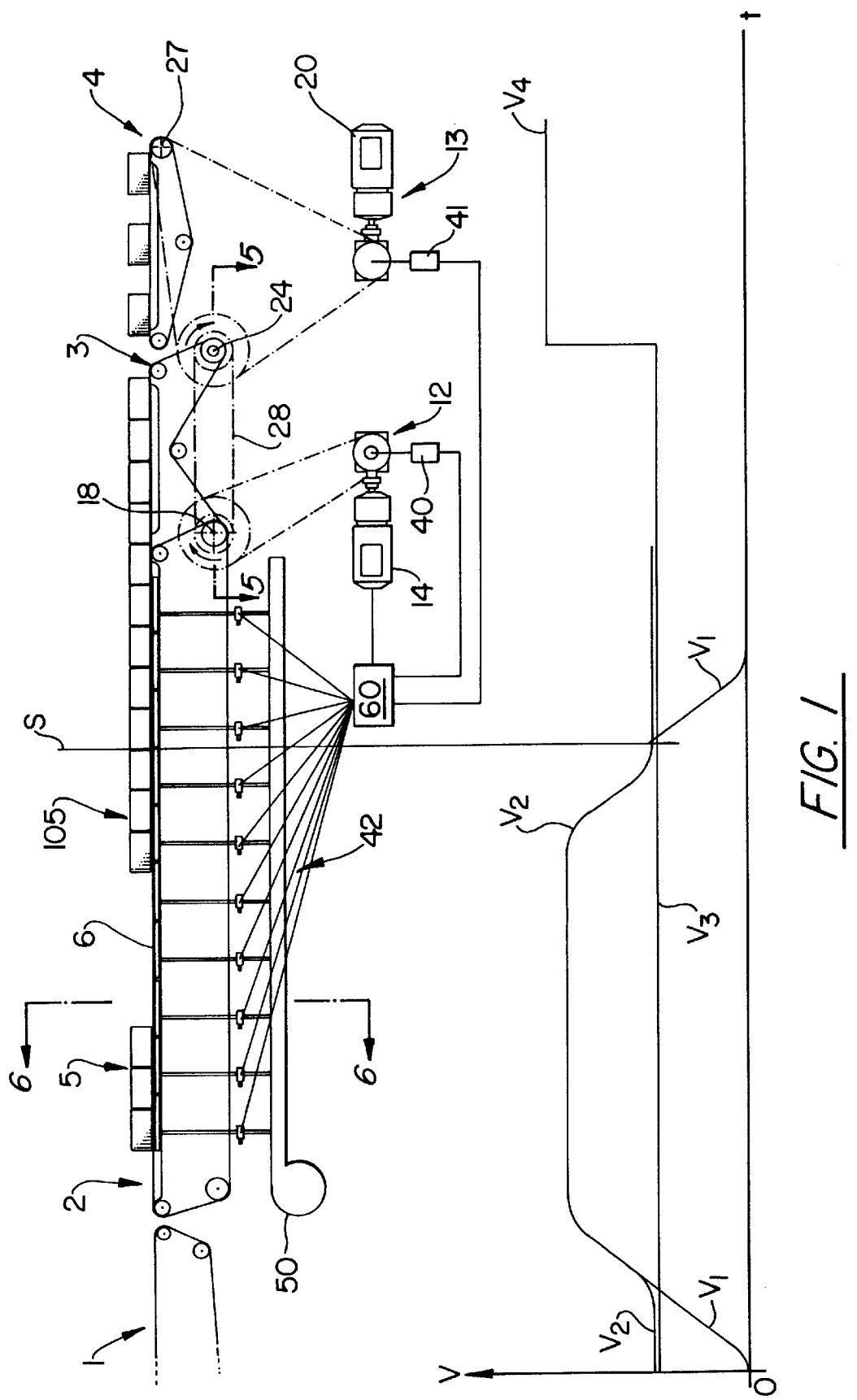
FIG. 1 A side view of a conveying apparatus according to an embodiment of the invention in a diagrammatic representation, with an only partly shown feed conveyor, a connecting conveyor, which overlaps with an accumulating conveyor, and a separating conveyor connected thereto, as well as a suction device with a plurality of fluid chambers in the overlap area of the connecting and accumulating conveyors, sheet stacks to be connected being shown on the connecting conveyor in a first position and a speed-time diagram is given illustrating the speed of the individual conveyors.

A connecting conveyor 2 is connected upstream to a diagrammatically represented feed conveyor 1. With the connecting conveyor 2 overlaps a further downstream accumulating conveyor 3, to which is downstream-connected a separating conveyor 4 (FIG. 1). The feed conveyor 1, connecting conveyor 2, accumulating conveyor 3 and separating conveyor 4 convey articles 5 in a common conveying direction, namely from left to right in FIG. 1 and in each case have a conveying plane, all of which are in a common conveying plane 6. Conveyors 1 to 4 are belt conveyors with corresponding conveyor belts.

Figure 3:
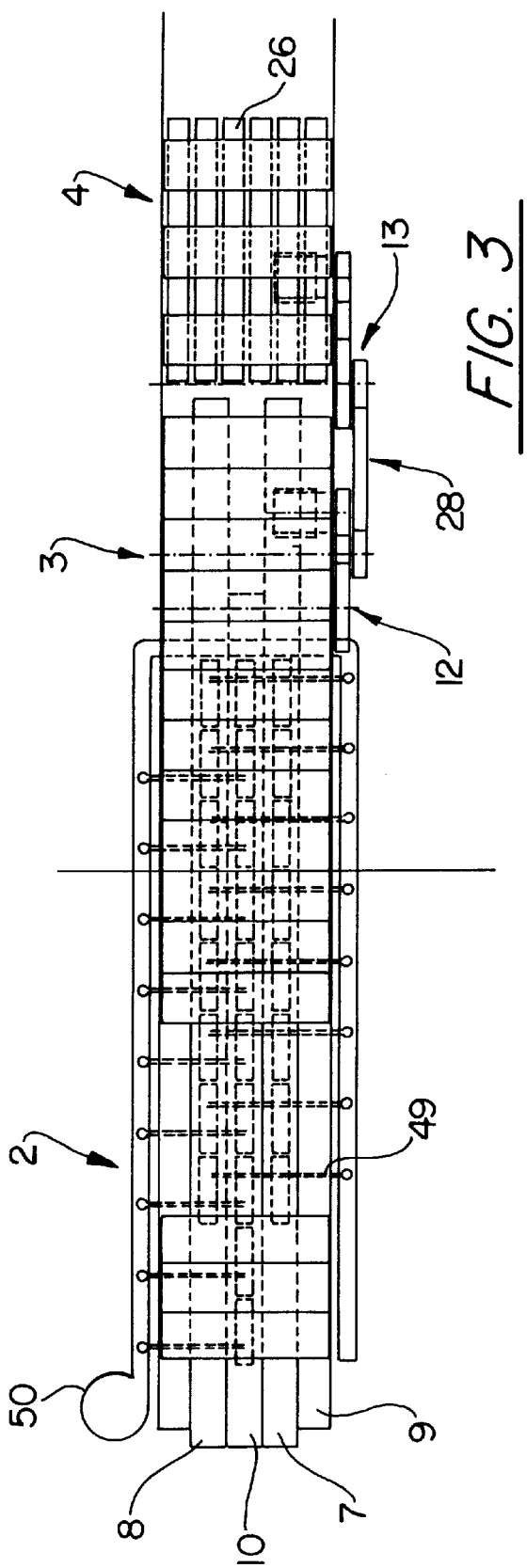
FIG. 3 A plan view of the connecting conveyor, accumulating conveyor and separating conveyor connected thereto with sheet stacks resting thereon in a position according to FIG. 1.

As is shown in FIG. 3, the accumulating conveyor 3 has two spaced conveyor belts 7 and 8 and adjacent to the lateral outside to a conveyor table 9. The connecting conveyor 2 only has one conveyor belt 10 positioned between the two conveyor belts 7 and 8 of the accumulating conveyor 3 and which overlaps with the conveyor belts 7 and 8 of the accumulating conveyor 3 in such a way that the entire conveying path of the connecting conveyor 2 starting from the same line as the accumulating conveyor 3 is entirely in the area of the conveying path of the conveyor 3, which also extends downstream. The conveyor surface of the conveyor belts 7 and 8 of the accumulating conveyor 3 and the conveyor belt 10 of the connecting conveyor 2 are relatively smooth and located in a common plane. In order to be able to supply suction air or air blast to the conveyor belts 7 and 8, as well as 10 of the connecting and accumulating conveyors 2, 3 respectively, as will be described hereinafter, the conveyor belts 7, 8 and 10 in each case have passage recesses 11 (FIG. 6) through which air can be sucked or blown. The conveyor belts 7, 8 and 10 are consequently constructed as suction belts.

Figure 5:
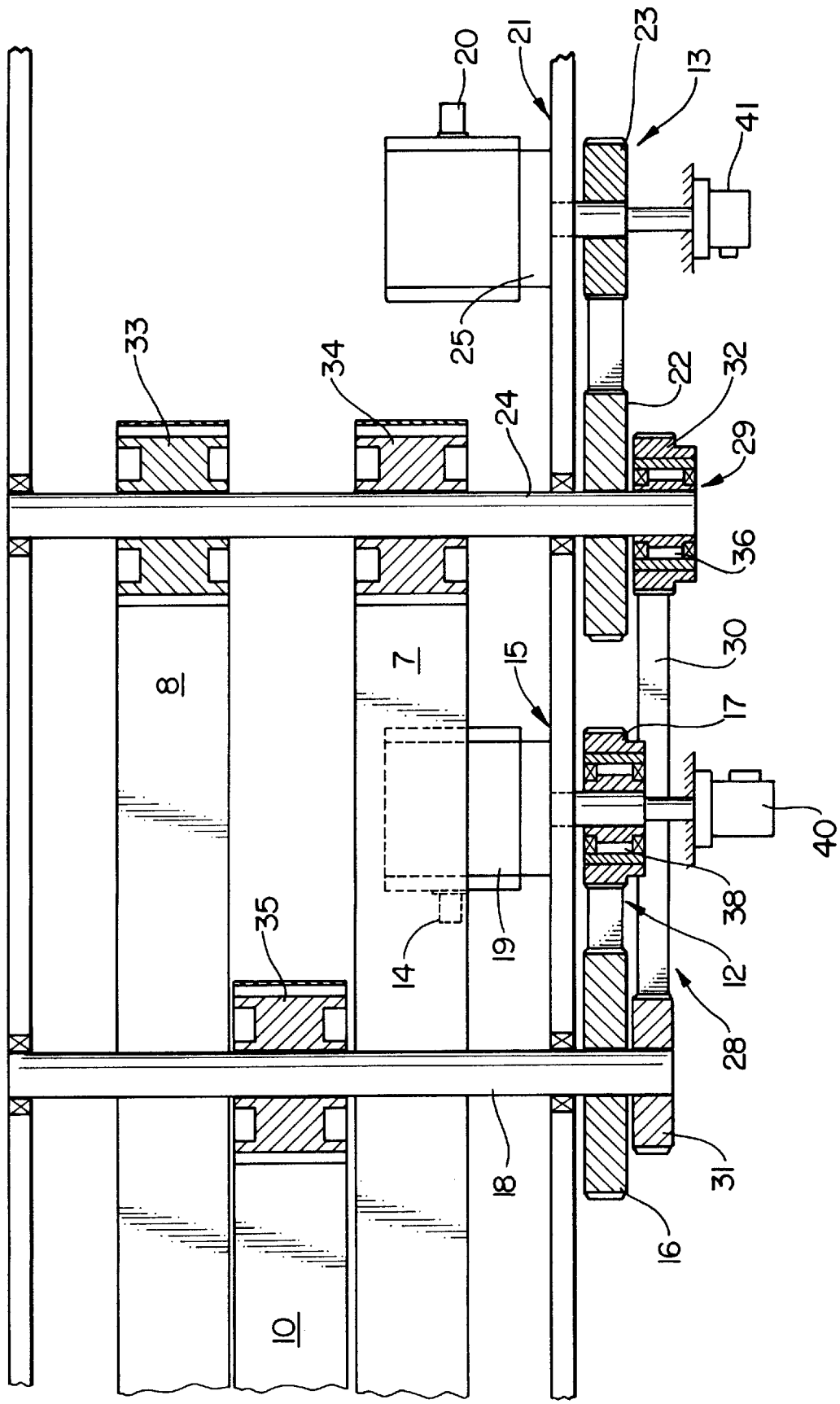
FIG. 5 A sectional view along II—II of FIG. 1 of the drive mechanisms of the connecting and accumulating conveyors, as well as a coupling gear with a freewheel clutch between the two drive mechanisms.

As shown in FIGS. 1 and 5, both the connecting conveyor 2 and the accumulating conveyor 3 has its own drive mechanism 12 or 13.

The drive mechanism 12 of the connecting conveyor 2 has an electric motor, which acts by means of a gear 15, particularly a chain or belt drive, preferably a timing belt drive, with associated pinions or pulleys 16 and 17 on a driving shaft 18 driving the conveyor belt 10. A step-up or reduction gear 19 can be positioned between the motor 14 and the timing drive.

The electric motor 14 can be operated at a variable speed, so that the conveyor 10 can also be operated with a different speed. This makes it possible to convey an article in the vicinity of the connecting conveyor 2 at a different speed and to connect it to an article preconveyed with the accumulating conveyor, as will be explained hereinafter.

The drive mechanism 13 of the accumulating conveyor 3 also has an electric motor, which acts by means of a gear 21, particularly a chain or belt drive, preferably a timing belt drive with associated pinions or pulleys 22 and 23 (FIG. 5) on a driving shaft 24 driving the accumulating conveyor belts 7 and 8. An upstream gear can be located between the timing belt drive and the electric motor 20. The electric motor 20 can be operated at a constant speed, in order to drive the accumulating conveyor belts 7 and 8 with a substantially constant speed.

As shown in FIG. 1, the driving mechanism 13 of the accumulating conveyor 3 is simultaneously connected to a driving shaft 27 driving the conveyor belts 26 of the separating conveyor 4, the driving strand for the separating conveyor 4 being stepped up relative to the driving strand for the accumulating conveyor 3, in order to operate the conveyor belts 26 of the separating conveyor 4 at a higher speed than the accumulating conveyor belts 7 and 8. The coupling of the drive of the separating conveyor 4 to the drive of the accumulating conveyor 3 brings about a constant speed difference between the conveyor 4 and the conveyor 3. This has the advantage that the articles taken over by the separating conveyor 4 from the accumulating conveyor 3 and drawn apart always have the same mutual spacing.

The independent driving mechanism 12 and 13 of the connecting conveyor 2 and accumulating conveyor 3 are interconnected by a coupling device 28 (FIGS. 1 and 5). The driving shaft 18 of the connecting conveyor belt 10 is entrained by the driving shaft 24 of the accumulating conveyor belts 7 and 8, but can also rotate faster than the latter. For this purpose the driving shafts 18 and 24 are interconnected by means of a timing belt drive 30 with associated pulleys 31 and 32 fixed to the driving shafts 18 and 24, accompanied by the interposing of a freewheel mechanism 29. In place of the timing belt drive 30 it would also be possible to have some other gear connection between the two driving shafts 18 and 24, but the described arrangement offers advantages with respect to the axial spacing to be bridged. The pulleys 31 and 32 have for the same diameter of the driving pulleys 33, 34 and 35, over which the accumulating belts 7 and 8 or the connecting conveyor belt 10 run, the same diameter, so that if the driving shaft 18 of the connecting conveyor 2 is entrained by the driving shaft 24 of the accumulating conveyor 3, the connecting conveyor 2 is operated at the same speed as the accumulating conveyor 3.

The freewheel mechanism 29 has a freewheel clutch 36 located in the timing belt drive 30, particularly in the pulley 32, which makes it possible for the driving shaft 18 to overtravel the driving shaft 24 when driven by the motor 14. The freewheel mechanism 29 also has a freewheel clutch 28 connected in the drive strand between the electric motor 14 and the driving shaft 18, so that with a synchronous drive of the driving shaft 18 through the coupling device 28 the electric motor 14 is not carried along and disconnected. The free wheel clutch 38 is preferably integrated into the pulley 17 of the driving mechanism 12 (FIG. 5).

Thus, the drive of the connecting conveyor 2 and the accumulating conveyor 3 is so constructed that on driving the accumulating conveyor 3 the connecting conveyor 2 is synchronously also driven and operated at the accumulating conveyor speed. Through the connection of the drive 12 of the connecting conveyor 2 the latter can overtravel the accumulating conveyor 3 and be operated at an increased speed.

To be able to establish at all times the position of the connecting conveyor 2 and accumulating conveyor 3, position determination devices are provided. In particular, with the driving mechanisms 12 and 13 are associated as rotation pick-ups encoders 40 and 41, which emit signals corresponding to the position of the accumulating conveyor belts 7 and 8 and the connecting conveyor belt 10 and are connected to a control device 60.

Figure 4:
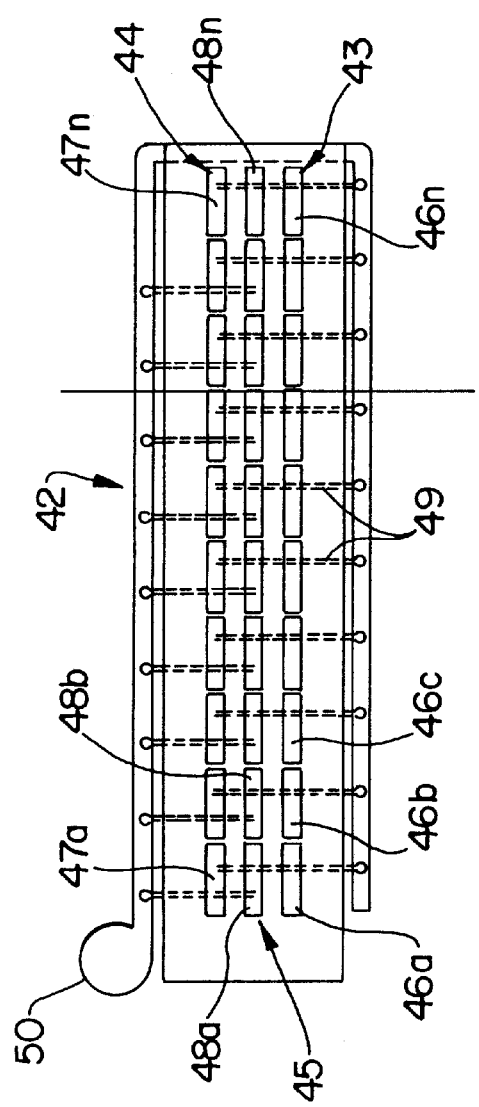
FIG. 4 A plan view of an arrangement of fluid chambers for supplying suction air and air blast to the articles, the fluid chambers being connected by connecting lines and valves located therein to a circumferential suction line of a suction device, an air blast line of an air blast device not being shown.

For the suction of the conveyed articles in the overlap area to the connecting conveyor 2 or accumulating conveyor 3 a suction device 42 is provided in said overlap area (FIGS. 1, 3 and 4).

Figure 6:
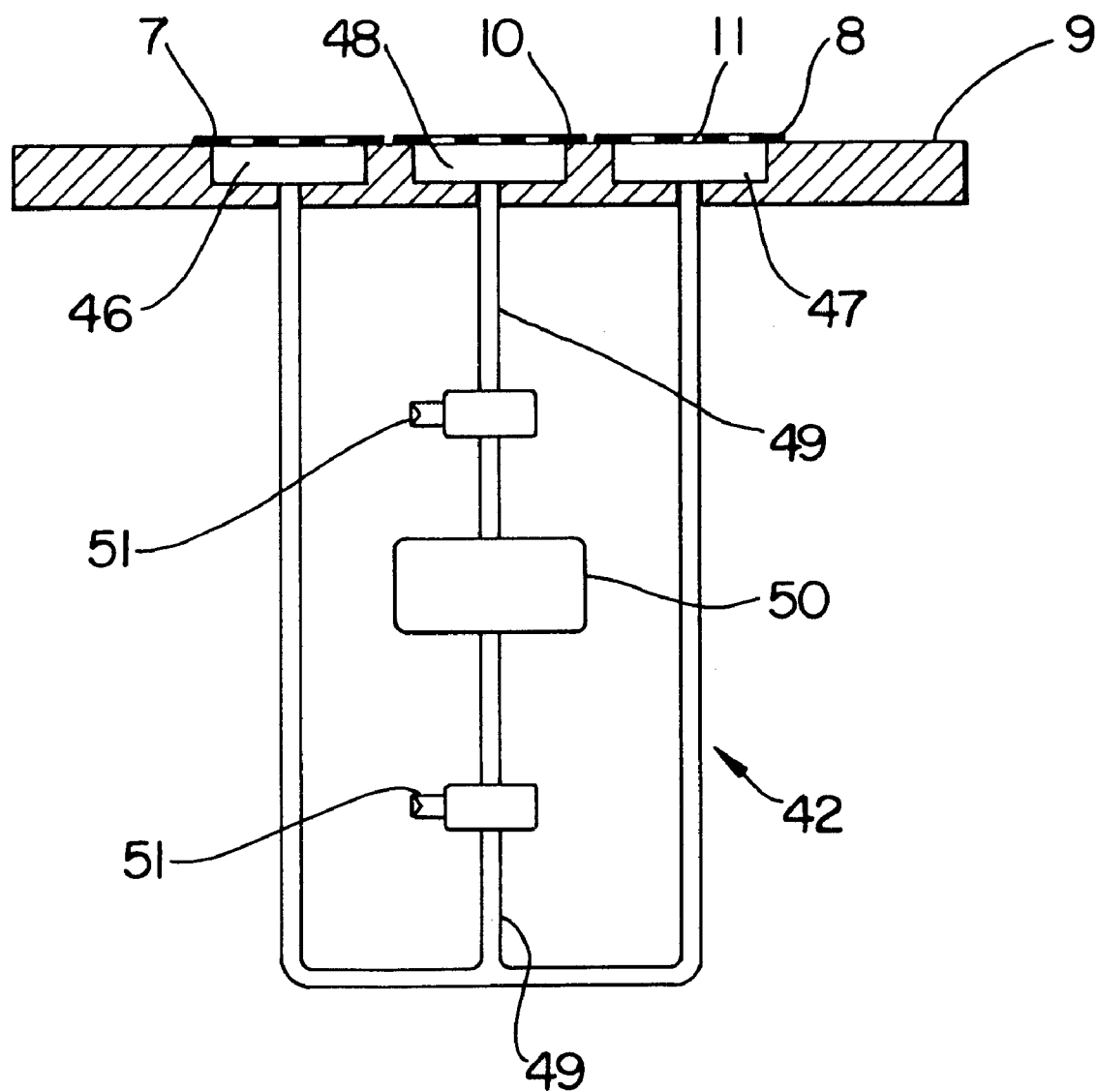
FIG. 6 A sectional representation along line I—I of FIG. 1, showing a suction device with associated suction chambers and the conveyor belts of the connecting and accumulating conveyors running above the same, as well as connecting lines connected to fluid chambers and the valves located therein.

Beneath the upper strands of the accumulating conveyor belts 7 and 8 and the connecting conveyor belt 10 are in each case provided suction boxes 43, 44 and 45, which are in each case subdivided into a plurality of individual fluid chambers 46a to 46n, 47a to 47n and 48a to 48n, which are arranged in immediately succeeding manner in the conveying direction beneath the corresponding conveyor belts 7, 8 or 10 (FIGS. 3, 4 and 6). The fluid chambers 46, 47, 48 are in each case separated from one another and individually connected by means of connecting lines 49 to a vacuum ring main 50, which is in turn connected to a not shown suction source, such as e.g. a vacuum pump. In each of the connecting lines 49 is provided a shutoff device, particularly a control valve 51, so that the individual fluid chambers 46, 47, 48 can be connected to and shutoff from the vacuum ring main 50. The control valves 51 are controlled by the control device 60. The fluid chambers 46a to 46n, 47a to 47n and 48a to 48n can be individually supplied with suction air and correspondingly in individual areas or sections of the accumulating conveyor belts 7 and 8 or the connecting conveyor belt 10 a suction action can be obtained. As shown in FIG. 6, the individual fluid chambers 46, 47 and 48 extend over substantially the entire width of the associated conveyor belts 7, 8 and 10, so that the suction action can be uniformly obtained over the entire width of the particular conveyor belt.

In order to supply air blast to the conveyed articles 5 in the overlap area of the connecting conveyor 2 and accumulating conveyor 3, an air blast device not completely shown in the drawings is provided. Similar to the suction air device, said air blast device has an air blast source, which is connected to a compressed air ring main, to which are individually connected through corresponding connecting lines the fluid chambers 46a to 46n, 47a to 47n and 48a to 48n. In said connecting lines are provided shutoff devices, particularly control valves, so that the fluid chambers can be individually supplied with an air blast, which passes out through the passage recesses 11 of the conveyor belts 7, 8 and 10 (FIG. 6). Thus, on connection to the vacuum ring main 50, the fluid chambers 46, 47, 48 act as suction chambers and on connection to the not shown compressed air ring main as compressed air chambers.

On connecting the fluid chambers 46, 47, 48 to the vacuum ring main 50 and the corresponding compressed air ring main, it is appropriate to construct the valves 51 sown in FIG. 6 as three-way valves, which connect the section of the connecting lines 49 leading to the corresponding fluid chambers 46, 47, 48 in a first valve position to the vacuum ring main 50, in a second valve position shutoff the same and in a third valve position connect them to the compressed air ring main.

Corresponding to the subdivision of the suction boxes 43, 44, 45 into individual fluid chambers 46, 47, 48, in the vicinity of the accumulating conveyor belts 7 and 8 and the connecting conveyor belt 10 in each case in sectional manner either a suction action or an air cushion action can be achieved. By corresponding changeover through the control device 60, the friction action between the conveyed articles and the individual conveyor belts 7, 8 and 10 can be partially modified and controlled, so that in accordance with different speeds of the conveyor belts 7, 8 and 10 an article 5 conveyed thereon can be coupled to one or both of the conveyor belts and carried along by the same.

Figure 2:
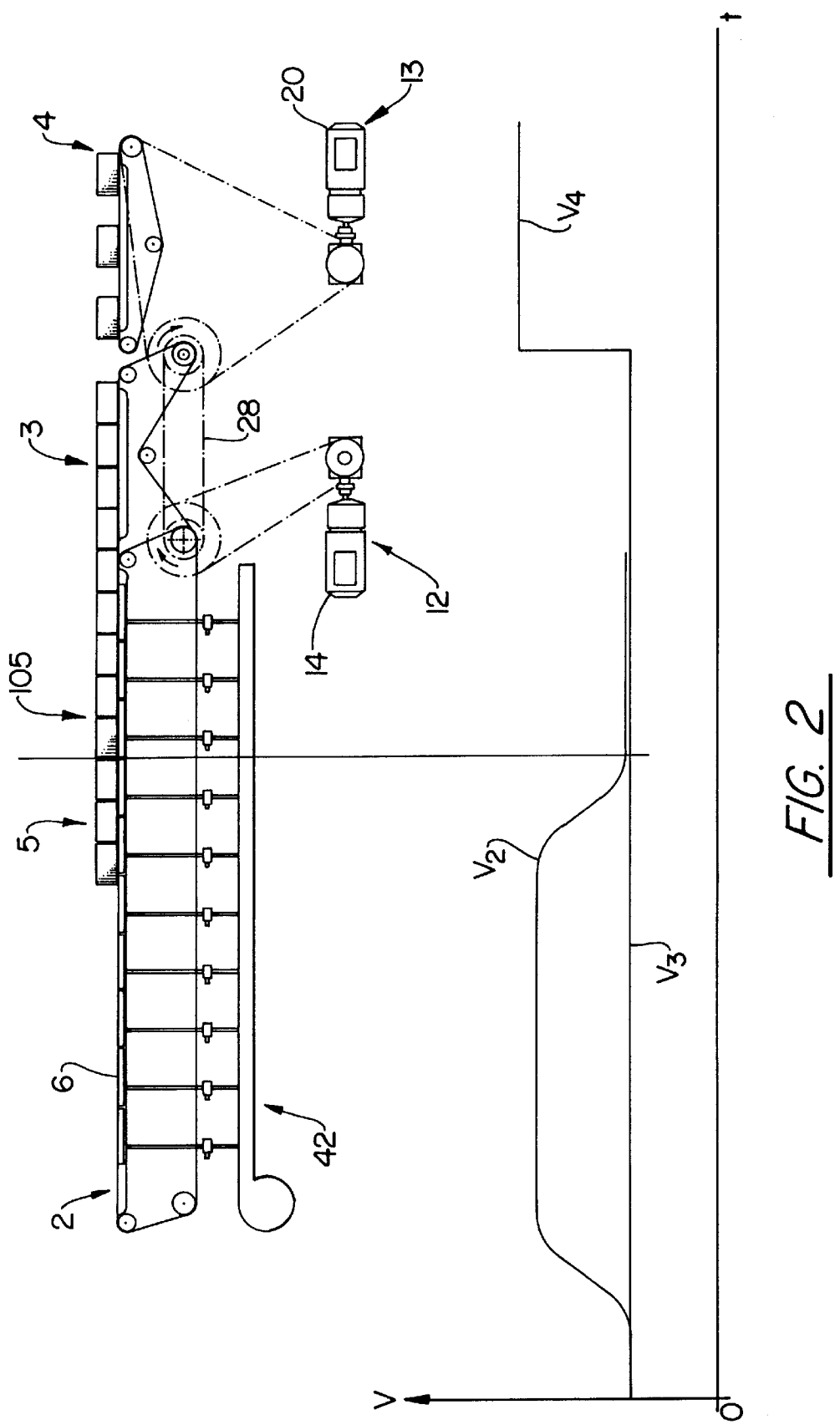
FIG. 2 A diagrammatic side view similar to FIG. 1 of the conveying apparatus according to FIG. 1, the sheet stacks being shown in a second position, in which a trailing group of sheet stacks to be connected has reached an accumulation point, the feed conveyor of FIG. 1 not being shown.

The function and operation of the conveying apparatus will now be explained with particular reference to FIGS. 1 and 2.

Firstly, with the feed conveyor 1 stationary, a paper stack 5 is shoved or pulled onto it e.g. from a cutting mechanism. Through the starting up of the feed conveyor 1 the sheet stack or group of sheet stacks are accelerated to the speed $V_1$ (FIG. 1) and supplied at this speed to the connecting conveyor 2 and are transferred thereto. Before the sheet stack reaches the connecting conveyor 2, the connecting conveyor belt 10, which is initially driven by means of the coupling device 28 at the accumulating conveyor speed $V_3$ (FIG. 1), is accelerated to the increased speed $V_2$ (FIG. 1) by connecting the electric motor 14. The speed $V_1$ of the feed conveyor 1 is so chosen that it corresponds to the increased speed $V_2$ of the connecting conveyor 2 (FIG. 1). The conveyed sheet stack is correspondingly jerkless and is transferred without acceleration or deceleration to the connecting conveyor 2 and is conveyed at the same speed, namely $V_2=V_1$.

The feed conveyor 1 can have its own drive mechanism, which can be operated at a variable speed independently of the drive mechanisms 12 and 13 of the connecting conveyor 2 and the accumulating conveyor 3.

Preferably the feed conveyor 1 is driven by the drive mechanism 12 of the connecting conveyor 2. A driving shaft of the feed conveyor 1 can be gear-connected to the electric motor 14, particularly by a not shown timing belt drive and preferably accompanied by the interposing of an overtravellable, not shown freewheel mechanism. This offers the advantage that when an article is transferred from the feed conveyor 1 to the connecting conveyor 2 said two conveyors run in a precisely synchronous manner. On starting up the electric motor 14, initially only the feed conveyor 1 is brought up to speed, whereas the connecting conveyor 2 is operated at the constant speed $V_3$. When the electric motor 14 reaches or exceeds a speed corresponding to the conveying speed $V_3$, the connecting conveyor 2 is entrained and is accelerated together with the feed conveyor 1 to an increased speed $V_2>V_3$ (FIG. 1).

The accumulating conveyor belts 7 and 8 extending to the upstream end of the connecting conveyor, i.e. up to the transfer area between the feed conveyor 1 and the connecting conveyor 2 and which run with a constant accumulating conveyor speed $V_3$, are overtaken by the sheet stack 5 conveyed at the increased speed $V_2$. The sheet stack 5 slides away over the conveyor belts 7 and 8.

In order to convey the sheet stack 5 conveyed in the overlap area through the connecting conveyor belt 10 with the increased speed $V_2$ and prevent the deceleration of the sheet stack by the more slowly running accumulating conveyor belts 7 and 8 at speed $V_2$, the sheet stack 5 is subject to a suction air action in the vicinity of the connecting conveyor belt 10 and to an air blast action in the vicinity of the two accumulating conveyor belts 7 and 8, so that the sheet stack is sucked onto the connecting conveyor belt 10 and slides on an air cushion relative to the accumulating conveyor belts 7 and 8.

For this purpose the control device 60 controls the valves 51 in such a way that the particular fluid chambers 48a to 48n associated with the connecting conveyor belt and located below the sheet stack 5 are connected to the vacuum ring main 50 and the fluid chambers 46a to 46n, 47a to 47n associated with the accumulating conveyor belts 7 and 8 and located below the sheet stack 5 are connected to the compressed air ring main.

The suction air and air blast action is continued with the conveying movement of the sheet stack 5 and is in each case limited to the area over which the sheet stack 5 passes. The rotation pick-up 40 determines the position of the sheet stack 5 moved with the conveyor belt 10 and which corresponds to the position of the conveyor belt 10. Corresponding to the signals from the rotation pick-up 40, the fluid chambers located under the sheet stack 5 in accordance with its position are activated with suction air or air blast, whereas not yet reached and already overtravelled fluid chambers 46, 47, 48 are disconnected by the control device. In the position of the sheet stack 5 or group of sheet stacks 5 shown in FIGS. 1 and 3 the chambers 48a and 48b are supplied with suction air and air blast is blown onto the sheet stack 5 through the chambers 46a, 46b, 47a and 47b. As the leading edge of the sheet stack 5 (right-hand edge of the sheet stack 5 in FIG. 3) has just reached the chambers 46c, 47c and 48c, these previously blocked chambers are activated and subject to a suction air or air blast action.

The preconveyed sheet stack 105 (FIG. 1) is already connected to the sheet stack accumulated upstream of the separating conveyor 4 and is conveyed at the accumulating conveyor speed $V_3$. The already accumulated sheet stack 105 is still in the overlap area between the connecting and accumulating conveyors 2 and 3, so that the connecting conveyor belt, which has the speed $V_2$, relative to the sheet stack 105, passes too rapidly beneath the same, whereas the sheet stack 105 is conveyed by the accumulating conveyor belts 7 and 8. In the vicinity of the sheet stacks 105, the fluid chambers 46, 47, associated with the accumulating conveyor belts 7 and 8, and located below the same are connected to the vacuum ring main 50, in order to suck the sheet stack 105 or group of sheet stacks 105 onto the accumulating belts 7 and 8. To avoid damage to the sheet stack 105 in the vicinity of the passing through connecting conveyor belt 10 and prevent an undesired acceleration of the sheet stack 105 to above the accumulating conveyor speed $V_3$, the fluid chambers 48, associated with the connecting conveyor belt 10, located beneath the sheet stack 105 in accordance with the position thereof can be connected to the compressed air ring main, so as to produce an air cushion between the connecting conveyor belt 10 and the sheet stack 105.

Correspondingly the sheet stacks 5 and 105 to be interconnected move at different speeds, namely $V_2$ and $V_3$ (FIG. 1). The spacing of the two articles 105 and 5 correspondingly decreases continuously. The position of the articles 105 and 5 is constantly determined by the rotation pick-ups 41 and 40 and the corresponding signals are processed by the control device in order to control the suction air device and the air blast device and to control the conveying speed $V_3$ and $V_2$ of the accumulating conveyor belts 7, 8 and the connecting conveyor belt 10.

In order to connect the sheet stack 5 gently and without impacts to the sheet stack 105, prior to reaching the accumulation point S, the speed of the connecting conveyor 2 is continuously reduced to the speed $V_3$ of the accumulating conveyor 3 (FIG. 2) in such a way that the connecting conveyor 2 and the sheet stack 5 to be connected is decelerated to the speed $V_3$ precisely at the accumulation point S, i.e. when a leading edge of the sheet stack 5 reaches a trailing edge of the sheet stack 105. On reaching the accumulation point S the driving mechanism 12 of the connecting conveyor 2 is disconnected and the connecting conveyor belt 10 is driven by the coupling device 28 synchronously with the accumulating conveyor speed $V_3$.

On reaching the accumulation point, or optionally shortly thereafter, the suction air and air blast action is switched over or off. For as long as both the connecting conveyor and the accumulating conveyor are operated at the speed $V_3$, the air blast and suction air action can be completely switched off, because then the accumulating conveyor belts 7 and 8 and connecting conveyor belt 10 have no speed difference in the overlap area.

If the connecting conveyor 2 is again accelerated to a higher speed $V_2$, in order to once again take a sheet stack from the feed conveyor 1 and connect same to the sheet stack 5, the sheet stacks 5 and 105 still conveyed in the overlap area are subject to a suction air action in the vicinity of the accumulating conveyor belts 7 and 8 and to an air blast action in the vicinity of the connecting conveyor belt 10.

The accumulated sheet stacks are fed at a constant speed $V_3$ to the separating conveyor 4 and on the latter, corresponding to its higher speed $V_4$ are accelerated thereto and drawn apart by the in each case following sheet stacks not yet engaged by the separating conveyor 4.

The inventive conveying apparatus is characterized by its simple construction and the precise, impact-free connection of initially spaced sheet stacks. Through the coordination and control of the conveying speeds of the conveyors, a sheet stack is at all times coupled to at least one conveyor without slipping. The suction air and air blast action brings about a precise, damage-avoiding conveying of the sheet stacks. The partial suction air and air blast action moving along with the articles also reduces the necessary air flows.

It is to be noted that the preferred embodiment does not necessarily represent the full skope of the invention. Reference is therefore necessary to the claims.

We claim:

1. Method for conveying articles, particularly sheet stacks, comprising the steps of:
   conveying the articles on a connecting conveyer and an accumulating conveyor overlapping with the connecting conveyor in an overlap area in a common direction, at least one of said conveyors associated with associated fluid chambers;
   connecting each said fluid chambers to a suction air unit and an air blast source;
   connecting following articles to previously conveyed articles at an accumulation point corresponding to different speeds of the connecting conveyor and the accumulating conveyor; and,
   sucking the articles by means of suction air onto at least one of the connecting conveyor and the accumulating conveyor at least in the overlap area.

2. Method according to claim 1, wherein the articles are decoupled from the connecting conveyor and coupled to the accumulating conveyor by modifying conditions determining the friction action on the conveyors at the accumulation point.

3. Method according to claim 1, wherein the articles to be interconnected are successively sucked onto the connecting conveyor and accumulating conveyor.

4. Method according to claim 1, wherein a suction action is only applied in a portion of at least one of the connecting conveyor and the accumulating conveyor where a corresponding article is located on the connecting conveyor and/or accumulating conveyor and in accordance with the conveying speed suction occurs on successive, following portions.

5. Method according to claim 1, wherein a preceding article is conveyed by the accumulating conveyor at a constant first speed and an article to be connected is conveyed in a first step by the connecting conveyor at a second speed higher than the first speed and in a second step is continuously decelerated to the first speed by the connecting conveyor.

6. Method according to claim 1, wherein an air blast is applied to articles in the area of at least one of the accumulating conveyor and the connecting conveyor from which the articles are to be decoupled.

7. Method according to claim 6, wherein the air blast is only blown in in the area of the articles to be decoupled corresponding to their position on successively following portions of the accumulating conveyor and connecting conveyor.

8. Method according to claim 1, wherein the suction air on the articles substantially migrates with a leading edge of the particular article.

9. Conveying apparatus for conveying articles, particularly sheet stacks, said apparatus comprising:

a connecting conveyor;

an accumulating conveyor, said conveyors having a common conveying direction and overlap one another in an overlap area and can be operated at different speeds, at least one of said conveyors associated with associated fluid chambers, each fluid chamber connectable to a suction air unit and an air blast source; and, a suction device for sucking the articles onto at least one of the connecting conveyor and the accumulating conveyor in the overlap area thereof.

10. Conveying apparatus according to claim 9, wherein an adjusting device is provided for adjusting parameters determining the friction action on at least one of the connecting conveyor and the accumulating conveyor, the adjusting device comprising a switching unit for switching the parameters from a first adhesion setting, in which an article to be connected adheres to the connecting conveyor, to a second adhesion setting in which the article adheres to the accumulating conveyor.

11. Conveying apparatus according to claim 9, wherein the suction device has a suction area, which can be limited to a portion of the connecting conveyor and the accumulating conveyor in which is located the article to be sucked, the suction area being adjustable in accordance with the position of the article to be sucked to different portions of the connecting conveyor and accumulating conveyor.

12. Conveying apparatus according to claim 9, wherein the suction device has a suction area associated with the connecting conveyor and a suction area associated with the accumulating conveyor.

13. Conveying apparatus according to claim 9, wherein a control device for controlling the suction air device is provided, so that in an area of an article, only one of the connecting conveyor and the accumulating conveyor is supplied with suction air, said area of the article corresponding to its position.

14. Conveying apparatus according to claim 9, wherein an air blast device is provided for supplying air blast to the articles.

15. Conveying apparatus according to claim 14, wherein the air blast device has an outlet, which can be limited to a portion of at least one of the connecting conveyor and accumulating conveyor in which the corresponding article is located and is adjustable to several portions along the conveying direction.

16. Conveying apparatus according to claim 14, wherein the air blast device has an outlet associated with the connecting conveyor and an outlet associated with the accumulating conveyor.

17. Conveying apparatus according to claim 14, wherein a control device is provided for controlling the air blast device in such a way that in an area of an article only on of the connecting conveyor and the accumulating conveyor is supplied with an air blast, said area of the article corresponding to its position.

18. Conveying apparatus according to claim 17, wherein the control device is connected to a determination device for determining the position of the articles, the determination device having at least one rotation sensor for indirect determination of the position of the articles associated with at least one driving mechanism of the connecting conveyor and the accumulating conveyor.

19. Conveying apparatus according to claim 9, wherein the fluid chambers are positioned immediately adjacent to one another, along the common conveying direction of the connecting conveyor and the accumulating conveyor.

20. Conveying apparatus according to claim 9, wherein a conveying plane of the connecting conveyor and a conveying plane of the accumulating conveyor are located in a common plane.

21. Conveying apparatus according to claim 9, wherein the connecting conveyor and accumulating conveyor in each case have a driving mechanism, the driving mechanism of the connecting conveyor being operable with a higher initial speed than the driving mechanism of the accumulating conveyor and a coupling device is provided for coupling the connecting conveyor, to the driving mechanism of the accumulating conveyor, said coupling device be overtravellable by said connecting conveyor.

22. Conveying apparatus according to claim 9 further comprising a discontinuously operable feed conveyor, which is positioned upstream of the connecting conveyor, the feed conveyor having a common conveying direction with the connecting conveyor and is operalbe at a variable speed in a range identical to or lower than a speed of the connecting conveyor.

23. Conveying apparatus according to claim 22, wherein a control device is provided for controlling the speeds of the feed conveyor and the connecting conveyor, so that for delivering an article to the feed conveyor the latter is stationary and for transferring an article from the feed conveyor the the connecting conveyor both have the same conveying speed.

* * * * *